(No Model.)

M. B. RING & J. I. LAVOIE.
VEHICLE GEAR.

No. 377,211. Patented Jan. 31, 1888.

Witnesses
Wm P. Potter Jr
Allen Terry

Inventor
Michael B. Ring,
Joseph I. Lavoie,
By their Attorney
Frank H. Allen

UNITED STATES PATENT OFFICE.

MICHAEL B. RING, OF NORWICH, AND JOSEPH I. LAVOIE, OF TAFTVILLE, CONNECTICUT.

VEHICLE-GEAR.

SPECIFICATION forming part of Letters Patent No. 377,211, dated January 31, 1888.

Application filed April 11, 1887. Serial No. 234,328. (No model.)

*To all whom it may concern:*

Be it known that we, MICHAEL B. RING, of Norwich, and JOSEPH I. LAVOIE, of Taftville, both of New London county, Connecticut, both citizens of the United States, have made certain new and useful Improvements in Vehicle-Gears, which improvements are fully set forth and described in the following specification, reference being had to the accompanying drawings, in which—

Figure 1:
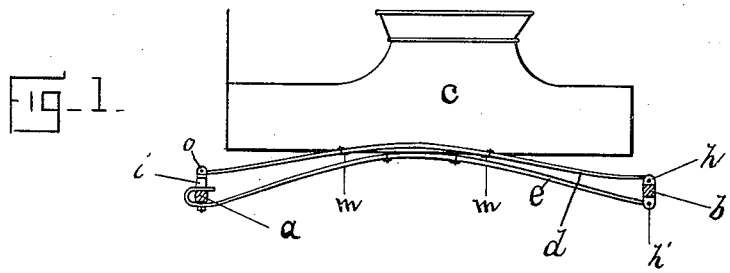
Figure 2:
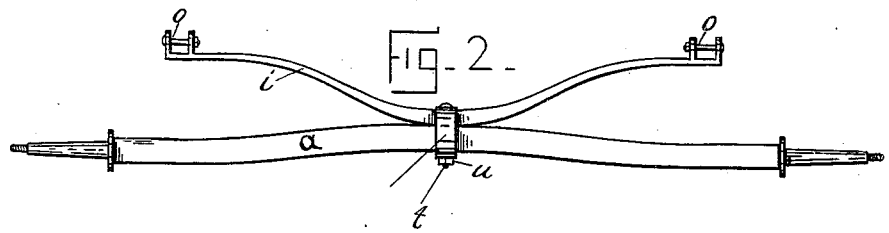
Figure 5:
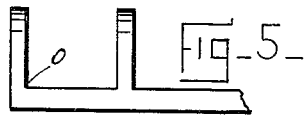
Figure 6:
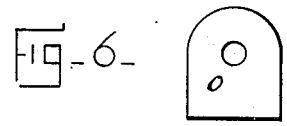
Figure 3:
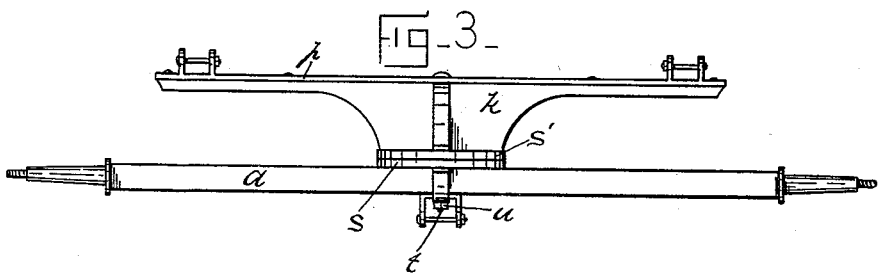
Figure 4:
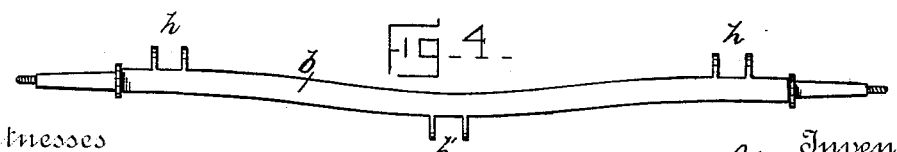

Figure 1 is a side elevation of a buggy or "road wagon" in which are embodied our improvements, the wheels being removed to show more clearly the arrangement of the several springs. Fig. 2 is a front view of the front axle having seated thereon a semi-elliptic spring whose ends in practice support one end of the side springs. Fig. 3 is a similar view having a rocker-arm substituted for the said semi-elliptic spring. Fig. 4 is an elevation of the rear axle. Fig. 5 is an enlarged side view of one of the stubs o, and Fig. 6 an outer end view of the same.

This invention is in the class of road conveyances commonly known as "suspension-gears," and has for its object the production of a gear which shall be strong in its parts, easy in action, and of comparatively cheap construction. We have also combined great strength with lightness by forming integral spring-connections on the rear axle and on the transverse spring i, instead of using removable clips.

Referring to the drawings, the letter a indicates the front axle, and b the rear axle. The body c is supported by semi-elliptic springs d (one on each side) and a central spring, e. The side springs, d, at the rear end are pivoted in lugs h, formed as integral parts of the rear axle, and at their front end to a semi-elliptic spring, i, or to a rocker-arm, k, the former being preferably used in light road vehicles and the latter in heavy wagons. The body is suspended between the side springs, d, being secured to said springs by brackets m. The center spring, e, is hung at its rear end in axle-lugs h', and at its forward end (when used with a light gear) is turned backward upon itself, as at e', and embraces the spring i and front axle, the several parts being secured pivotally together by a king-bolt, t, and nut u. The central spring, e, is screwed or clipped directly to the under side of the body without the intervention of brackets or trusses.

The construction described adds materially to the elasticity of the gear, and also enables us to dispense with the usual form of reach and brace connections; and it will be further noticed that in a light road vehicle embodying our improvements no wood-work is employed or needed below the body.

The general combination of elementary parts thus far described, for the purpose of producing a light, strong, cheap, and serviceable gear, forms one of the features which we believe to be new.

Referring to Fig. 4, the spring-connections h and h' are located, respectively, on the upper and lower sides of the rear axle, so that the "draw" from the side springs may offset that of the central spring, and thus prevent any tendency on the part of the axle to roll or partially rotate in going up or down hill or when suddenly stopped or started. These spring-connections h h' are formed as integral parts of the rear axle to overcome the tendency to work loose and become displaced, which results when ordinary clips are used. When so formed, (with integral lugs,) the axle may be drop-forged in sections of convenient length and subsequently welded together.

As a further improvement, we have formed the spring-connections o, at the ends of spring i, integral with said spring, said connections being also drop-forged in so-called "stubs," as shown in Fig. 5, and afterward welded to said spring.

When a rocker-arm, k, is used, the spring-connections o are welded to the ends of a bar or strap, p, which is then bolted to the wooden rocker, as in Fig. 3, and a circle plate of ordinary construction is provided, whose lower part, s, is bolted and strapped to the front axle, and whose upper section, s', is secured to the rocker. A king-bolt, t, passes downward through the rocker, circle plate, and axle, and also, in this latter form of gear, through a bracket, n, provided to support the front end of the center spring, e, the whole being secured by a nut, u.

Having thus described our invention, we claim—

In combination with the front and rear axles, transverse spring i, seated on the front axle, side springs extending from the ends of said transverse spring to the rear axle, the central spring, e, secured to the rear axle at one end and bent back upon itself at the other end to embrace spring i and the front axle, and the king-bolt t, all being substantially as and for the objects specified.

MICHAEL B. RING.
JOSEPH I. LAVOIE.

Witnesses:
FRANK H. ALLEN,
G. B. KIMBALL.